(12) United States Patent
Krishnan et al.

(10) Patent No.: US 12,141,128 B2
(45) Date of Patent: Nov. 12, 2024

(54) PERFORMANCE EFFICIENT BLOCKCHAIN APPLICATION PROGRAMMING INTERFACES

(71) Applicant: VMware LLC, Palo Alto, CA (US)

(72) Inventors: Ram Krishnan, Cupertino, CA (US); Dharmaraj Rajendra Parmar, Cupertino, CA (US)

(73) Assignee: VMware LLC, Palo Alto, CA (US)

( * ) Notice: Subject to any disclaimer, the term of this patent is extended or adjusted under 35 U.S.C. 154(b) by 284 days.

(21) Appl. No.: 17/509,281

(22) Filed: Oct. 25, 2021

(65) Prior Publication Data

US 2022/0414088 A1 Dec. 29, 2022

Related U.S. Application Data

(60) Provisional application No. 63/215,677, filed on Jun. 28, 2021.

(51) Int. Cl.
*G06F 16/23* (2019.01)
*G06F 9/54* (2006.01)
*G06F 21/60* (2013.01)

(52) U.S. Cl.
CPC .......... *G06F 16/2379* (2019.01); *G06F 9/547* (2013.01); *G06F 21/602* (2013.01)

(58) Field of Classification Search
CPC .... G06F 16/2379; G06F 9/547; G06F 21/602; G06F 21/64; G06Q 20/02; G06Q 20/065; G06Q 20/223; G06Q 20/3678; G06Q 20/3827; G06Q 20/3829; G06Q 20/389; G06Q 20/401; G06Q 20/4016; H04L 9/3247; H04L 9/50
See application file for complete search history.

(56) References Cited

U.S. PATENT DOCUMENTS 11,756,031 B1* 9/2023 Hamera ................ H04L 9/0637
705/75

OTHER PUBLICATIONS

Tabrizi, Graphing ETH Balance History of an Ethereum Address using Parallel Asynchronous Requests in Web3.js, pp. 1-20 (Year: Oct. 24, 2020).*
Minkowski, Intro to Blockchain with Ethereum, Web3j and Spring Boot: Smart Contracts, Aug 8, pp. 1-12, (Year: 2020).*
AWS Open Source Blog, The versatility of gRPC, an open source high performance RPC framework, (AWS) Nov. 19, pp. 1-10 (Year: 2020).*

* cited by examiner

*Primary Examiner* — Albert M Phillips, III
(74) *Attorney, Agent, or Firm* — King Intellectual Asset Management (57) ABSTRACT

This disclosure describes aspects of an efficient blockchain API communication mechanism that reduces the energy usage and data usage. In some examples, a publish-subscribe mechanism is used for completed transaction receipts for blockchain transactions of a blockchain. The publish-subscribe mechanism uses an open source remote procedure call protocol or hypertext transfer protocol (HTTP). Components of a distributed blockchain application use a single transport or communications protocol for both synchronous and asynchronous communications.

20 Claims, 5 Drawing Sheets

PERFORMANCE EFFICIENT BLOCKCHAIN APPLICATION PROGRAMMING INTERFACES

CROSS-REFERENCE TO RELATED APPLICATIONS

The present Application claims priority to U.S. Provisional Application No. 63/215,677, filed on Jun. 28, 2021, and entitled "EFFICIENT BLOCKCHAIN INFRASTRUCTURE," which is hereby incorporated herein by reference in its entirety.

BACKGROUND

Blockchains are becoming a popular solution for enterprises to support fungible and non-fungible transactions. Blockchain transactions can enable users to access a durable history of transactions as well as the current status of transactional information. This provides additional security and trackability for transactions, providing additional security through transparency. Contracts, payments, agreements, asset records, chains of custody, ownership information, property rights, data logs, and other transactional information can be represented. Blockchains can be used as a transparent and durable way to record activity in a manner that maintains data so that it is not easily altered, corrupted, or destroyed.

However, certain aspects of blockchain techniques and infrastructures can be inefficient, including the data structures used for transactions as well as the data transmissions used for each transaction. As a result, there is a need for more efficient and effective blockchain infrastructures.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure describes an efficient blockchain Application Programming Interface (API) communication mechanism. The present disclosure is applicable to blockchain API communication mechanisms including public Ethereum® and Enterprise Ethereum®. In public Ethereum®, the end-user can manage their private key wallet, and the end-user decentralized application (dApp) signs the transactions. After signing the transactions, the end-user dApp communicates directly with the Ethereum® blockchain to submit transactions, poll for completed and failed transactions through transaction receipts, and poll/subscribe for new headers, logs, pending transactions, node synchronization ( ).

In enterprise Ethereum®, an external wallet application can manage the private keys of several end users. By using an external wallet application (e.g., Ethsigner), end-users can focus on core business logic and store their private keys securely in the external wallet. Given the external wallet app is managing several end-users, performance an important aspect of the mechanism, aligning with the three pillars, performance, privacy and permission of Enterprise Ethereum® Alliance (EEA) Architectures.

The described Ethereum® blockchain API communication mechanisms can provide a pub-sub solution for transaction state management performance optimization. The external wallet application microservice, after sending a signed transaction to the Ethereum® blockchain immediately polls the Ethereum® blockchain for the transaction receipt to determine when the transaction is successful or errored on the Ethereum® blockchain. While strategies such as periodic polling for transaction receipts (e.g., using a Web3j Integration Library) may bring some performance improvement, substantial performance improvement can be achieved through the described techniques such as pub-sub for completed and failed transactions besides pending transactions which completely avoid the polling overhead. For the described pub-sub mechanisms to be effective, the mechanisms can support for transactions in various states—completed, failed due to error, and pending.

The described Ethereum® blockchain API communication mechanisms objective can enhance the current scheme from polling-based to pub-sub based towards superior performance and efficiency, while draft EIP-758 subscriptions and filters for completed transactions can define a new scheme for transaction completion.

The described Ethereum® blockchain API communication mechanisms can provide multiple transaction completions as part of a single pub-sub notification. This can include an entire transaction receipt such as the eth_getTransactionReceipt. Besides performance improvements, there is a also a CPU energy efficiency benefit to using pub-sub by avoiding busy polling for transactions which may or may not be complete.

The described Ethereum® blockchain API communication mechanisms can provide gRPC server streaming techniques for pub-sub performance optimization. External wallet application microservices can use WebSockets for the subscription model for getting pub-sub notifications as per EEA specifications and also the aforementioned completed and failed transaction notifications from the blockchain. While WebSockets which uses TCP/IP can provide reasonable performance benefits, performance can be substantially improved through techniques such as gRPC-based server streaming. The gRPC community is rapidly growing community as compared to WebSockets. Also, gRPC natively integrates with the latest performance-optimized versions of HTTP, including HTTP 3.0 QUIC UDP/IP. As an example, each gRPC server stream (e.g., Ethereum® account transactions from an Ethereum® blockchain) can use a single optimized Layer 4-7 flow control loop leveraging the leverage the latest performance optimizations with HTTP 3.0 QUIC UDP/IP. By contrast, a WebSockets implementation can use 2 layers of flow control one in Layer 4 TCP/IP and another in Layer 5-7 WebSocket protocol. Further, gRPC can provide gRPC native encoding using protobuf and gRPC native compression as described further below. In a WebSockets implementation, encoding and compression can be left up to the application. In addition to performance improvements, the described Ethereum® blockchain API communication mechanisms can also provide a network energy efficiency benefit through compact gRPC native encoding using protobuf and gRPC native compression. The described pub-sub solution for transaction state management performance optimization and gRPC server streaming techniques for pub-sub performance optimization are complementary to each other. The described mechanisms can be used along with a performance working group in EEA in collaboration with the community. Code that provides the described blockchain API communication mechanisms can be integrated into a Integration Library such as Web3j. While the mechanisms can be discussed as Ethereum® blockchain API communication mechanisms, the mechanisms can be implemented and apply to other types of blockchains.

Embodiments can include an efficient Ethereum® blockchain API communication mechanism that includes one or more of: bi-directional streaming pub-sub using the same gRPC transport or hypertext transfer protocol (HTTP) transport, binary encoded data model based on protocol buffers, and support for multi-language and/or multi-platform bindings. In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

End-to-end transaction performance of Enterprise Ethereum® can be generally weak. In the typical transaction lifecycle, a lot of the current focus has been on the decentralized application (dApp) which submits transactions to the Ethereum® blockchain client, and on the Ethereum® blockchain itself. Deferred polling for transaction receipt in dApp integration libraries such as Web3j and the sharding efforts in the Ethereum® blockchain can be lossy. Meanwhile, there are performance challenges in the core Enterprise Ethereum®'s JSON-RPC based Application Programming Interface (API) which is used to communicate between the dApps and the Ethereum® blockchain client.

The Enterprise Ethereum® JSON-RPC based API can use two categories 1) Synchronous JSON-RPC API using JSON data model and HTTP etc. transport, and 2) Asynchronous JSON-RPC API using JSON data model and Websocket etc. transport. While the JSON data model is flexible in terms of underlying transport, it is inefficient in terms of network bandwidth consumption and network stack processing since the data is transported in the wire in textual format. However, the latest versions of HTTP, example HTTP3 with UDP-based QUIC can provide substantial performance improvement over HTTP 2.0/TCP and WebSockets since the dApp and the Ethereum® blockchain can be written in very different programming languages.

The present disclosure includes efficient Ethereum® blockchain API communication mechanism that can use gRPC and/or HTTP3 for both synchronous and asynchronous subscription based communication. The described mechanisms also enable subscriptions to provide multiple transaction receipts in a single notification or transmission. The described mechanisms describe a more efficient publication subscription mechanism that provides benefits over existing technologies including Enterprise Ethereum®. The improved mechanism can include an open source gRPC remote procedure call (gRPC) communication protocol based APIs for synchronous and asynchronous communications, for example, one or more APIs provided by the Ethereum® blockchain ledger client, which can be invoked using a transaction request. The term gRPC is an acronym that is used to identify corresponding protocol and data serialization standards.

The present disclosure describes mechanisms that can provide both synchronous and asynchronous bi-directional streaming pub-sub. Both communication types can use the same HTTP or gRPC based transport, such as HTTP3 or the latest-version HTTP. This is unlike JSON-RPC which uses different transports—HTTP for synchronous APIs and Websocket for asynchronous APIs. The described mechanisms can use binary encoded data model based on protocol buffers that can be optimized from a network bandwidth and network stack processing standpoint, unlike JSON-RPC which uses textual data model. The described mechanisms can support multi-language (C++, Java, Go etc.) and multi-platform (Linux, Android, iOS etc.) bindings, which makes it easy to switch to the latest version of HTTP in the end-user dApp, signer dApp, Ethereum® blockchain, and Ethereum® blockchain ledger client. As a result, updating a single transport component can provide more performance benefits than in existing systems that use JSON-RPC where the dApps and the blockchain/blockchain client are independently upgraded.

Figure 1:
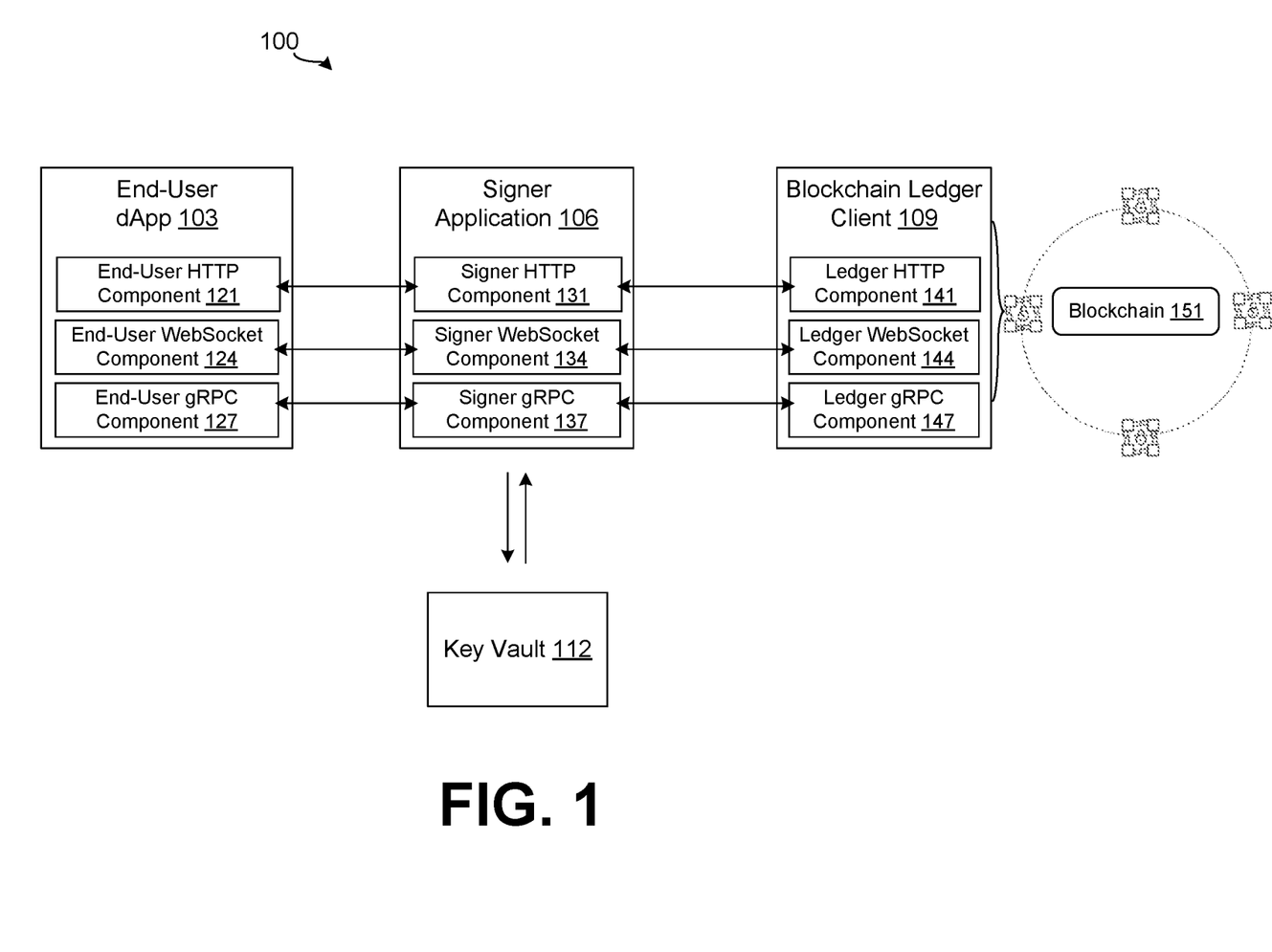
FIG. 1 is a drawing depicting a networked environment that includes components of a blockchain Application Programming Interface (API) communication mechanism, according to embodiments of the present disclosure.

FIG. 1 shows an example networked environment 100 that includes an end-user dApp 103, a signer application 106, a blockchain ledger client 109, a key vault 112, and a blockchain 151, among other components of an Ethereum® or other blockchain API communication mechanism. The Ethereum® blockchain API communication mechanism can be used in a number of ways including enterprise Ethereum® blockchain API communication mechanisms that include the signer application 106, as well as public Ethereum® blockchain API communication mechanisms that do not utilize the signer application 106.

For enterprise blockchain API communication mechanisms such as an Enterprise Ethereum® example, the signer application 106 can act as an external wallet, signer, enterprise, or server type dApp. This external wallet can control privacy and permissions and other aspects of the overall decentralized application. Other examples can omit the external wallet, and each end-user dApp 103 can communicate directly with the blockchain ledger client 109 application. The signer application 106 can include dApp-based signer applications 106 that are form a dApp along with the end-user dApp 103. While various dApps can be discussed separately, and can include instructions to complete a particular task, the collection of dApps can be an overall decentralized application. The signer application 106 can include a third party signer application relative to the end-user dApp 103. Each of the components of the networked environment 100 can be executed using one or more computing devices, which can be in a single location or distributed across multiple locations.

For public blockchain API communication mechanisms such as a public Ethereum® example, an end-user can use the end-user dApp 103 to manage their Ethereum® blockchain private key wallet. The end-user dApp 103 can sign the transactions without a separate signer application 106. After signing the transactions, the end-user dApp 103 can communicate directly with the blockchain ledger client 109 to submit Ethereum® blockchain transactions using synchronous (or asynchronous) transmissions using an end-user transport component such as an end-user HTTP component 121, an end-user WebSocket component 124 or an end-user gRPC component 127.

The end-user dApp 103 HTTP can include end-user transport components that use communications protocols such as HTTP or a gRPC protocol. The end-user HTTP component 121 can include a transport component that enables HTTP communications. The end-user WebSocket component 124 can include a transport component that enables WebSocket communications using a WebSocket protocol such as RFC 6455. The end-user gRPC component 127 can include a transport component that enables gRPC communications using a gRPC protocol. These end-user transport components can communicate with transport components of the signer application 106 and the blockchain ledger client 109, which can be considered remote transport components with respect to those of the signer application 106 and the device or devices used to execute it. The end-user dApp 103 can poll for, or subscribe to published notification of, a completed transaction receipt to determine when the transaction is successful or errored on the blockchain 151. The blockchain 151 can include an Ethereum® blockchain 151.

While the end-user dApp 103 can poll for completed transaction receipts to identify completed and failed transactions, the end-user dApp 103 can also use asynchronous communications such as a publication-subscription model to subscribe to completed transaction receipts using the same transport component that was used to submit Ethereum® blockchain transactions. The same end-user transport component and communication protocol can be used for submission of Ethereum® blockchain transactions, receiving published completed transaction receipts, as well as receiving new headers, logs, pending transactions, node synchronization, and other items.

The signer application 106 can include an external wallet application such as EthSigner in an Enterprise Ethereum® solution. The signer application 106 can manage the Ethereum® blockchain private keys of several end users. By using an external wallet application such as the signer application 106, end users can focus on core business logic and manage their Ethereum® blockchain private keys securely using the signer application 106. The Ethereum® blockchain private keys can be stored in a key vault 112, which can include an encrypted datastore that is locally or remotely accessed by the signer application 106. Since the external wallet app can manage several end-users and end-user dApps 103, fast and efficient performance is one of the aspects aligning with the three pillars, performance, privacy and permission of Ethereum® blockchain API communication mechanisms such as Enterprise Ethereum® Alliance™ (EEA) Architecture.

The signer application 106 can include signer transport components such as a signer HTTP component 131, a signer WebSocket component 134, and a signer gRPC component 137. The signer HTTP component 131 can include a transport component that enables HTTP communications. The signer WebSocket component 134 can include a transport component that enables WebSocket communications using a WebSocket protocol such as RFC 6455. The signer gRPC component 137 can include a transport component that enables gRPC communications using a gRPC protocol.

These signer transport components can communicate with transport components of the end-user dApp 103 and the blockchain ledger client 109, which can be considered remote transport components with respect to those of the signer application 106 and the device or devices used to execute it. The external wallet application microservice such as the signer application 106 can poll for, or subscribe to published notification of, a completed transaction receipt to determine when the transaction is successful or errored on the blockchain 151.

The blockchain ledger client 109 can include a ledger HTTP component 141, a ledger WebSocket component 144, and a ledger gRPC component 147. The ledger HTTP component 141 can include a transport component that enables HTTP communications. The ledger WebSocket component 144 can include a transport component that enables WebSocket communications using a WebSocket protocol such as RFC 6455. The ledger gRPC component 147 can include a transport component that enables gRPC communications using a gRPC protocol. These ledger transport components can communicate with transport components of the end-user dApp 103 and the signer application 106, which can be considered remote transport components with respect to those of the blockchain ledger client 109 and the device or devices used to execute it.

The components of the networked environment 100 can provide a publication-subscription (pub-sub) solution for transaction state management performance optimization. While strategies such as periodic polling for transaction receipts (e.g., using a Web3j Integration Library) may bring some performance improvement, performance can be substantially improved by using a pub-sub technique for completed and failed transactions. Pending transactions can avoid the polling overhead during pending time. Subscriptions and filters for completed transactions can be used. In order to enable a pub-sub solution to be effective, subscriptions can be supported for transaction in various states—completed, failed due to error, and pending. For example, an end-user dApp 103 or a signer application 106 can subscribe with the blockchain ledger client 109 to receive notifications published in association with a subscription identifier of a particular blockchain transaction or set of blockchain transactions.

This can improve energy and data efficiency over existing Ethereum® blockchains including Enterprise Ethereum®. The improvements can be achieved by eliminating polling as well as enabling multiple transaction completions as part of a single pub-sub notification, and further by providing an entire transaction receipt, which can include the request and return parameters and information that can be parallel with eth_getTransactionReceipt while using a publish-subscription notification rather than polling for the data. Besides performance improvements, there is also a CPU energy efficiency benefit to this architecture in using pub-sub to avoid busy polling for transactions with an unknown status, for example, transactions which may or may not be complete.

The components of the networked environment 100 can also provide open source high performance Remote Procedure Call (RPC) server Bi-directional streaming for pub-sub performance optimization. For example, some external wallet application microservices can use WebSockets for getting notifications and also the aforementioned completed and failed asynchronous transaction notifications from the blockchain 151. WebSockets use TCP/IP which provides an opportunity to substantially improve performance through techniques including open source high performance Remote Procedure Call (RPC) frameworks, such as gRPC server streaming. The gRPC framework is rapidly growing. The gRPC components and protocols natively integrate with the latest performance-optimized versions of HTTP, such as HTTP 3.0 QUIC UDP/IP, HTTP 2, and HTTP 1.X. Requests using HTTP 3.0 QUIC UDP/IP, HTTP 2, and HTTP 1.X can be more efficient than WebSocket.

As an example, each gRPC server stream (e.g., Ethereum® account transactions and receipts from the blockchain 151) can use a single optimized Layer 4-7 flow control loop leveraging the leverage the latest performance optimizations with HTTP 3.0 QUIC UDP/IP. By comparison, WebSockets can use 2 layers of flow control one in Layer 4 TCP/IP and another in Layer 5-7 WebSocket protocol. The gRPC protocols provide gRPC native encoding using a language-neutral, platform-neutral, and extensible mechanism for serializing structured data, such as protocol buffer (protobuf). The gRPC protocols also provide gRPC native compression. Protobuf usage can include a flexible user-definable data structure that can be more efficient than JSON and existing data structures for Ethereum® blockchain transitions.

The language-neutral, platform-neutral, extensible data structure can use special generated source code to write and read structured data to and from a variety of data streams and using a variety of languages. This can allow for more efficient data streams. Further, the solution can include native compression that is enabled using a parameter with invoking a transaction API of the blockchain ledger client 109, or otherwise transmitting a transaction to the blockchain ledger client 109. By contrast, WebSocket implementations can require encoding and compression that use a non-native application, such as a user space application that can also require collaboration and corresponding blockchain client side integration for some examples.

Besides performance improvements, there can also be a network energy efficiency benefit to using gRPC through compact gRPC native encoding using protobuf and gRPC native compression. A transaction API of the blockchain ledger client 109 can take a parameter that automatically enables native compression according to the gRPC native encoding instructions.

Pub-sub solution for transaction state management performance optimization and gRPC server streaming technique for pub-sub performance optimization are complementary to each other. Using gRPC or HTTP-based pub-sub for Ethereum® blockchain transaction receipt notification can provide higher throughput, lower latency, and lower CPU energy consumption as compared to a system which uses polling for transaction completion results. Using gRPC for Ethereum® blockchain pub-sub can provide higher throughput, lower latency, and lower Network energy consumption compared to a system which uses WebSockets for Ethereum® blockchain pub-sub. However, some implementations can use pub-sub without gRPC server streaming, and some implementations can use gRPC server streaming without a pub-sub model (e.g., using a polling technique).

These solutions can be provided, transmitted, or integrated into an Integration Library such as Web3j Integration Library or another modular, reactive, type safe Java and Android library for working with smart contracts and integrating with Ethereum® and other blockchains. This can enable users and enterprises to work with Ethereum® blockchains, without writing separate application-specific integration code for the platform.

A smart contract can include a self-executing contract with the terms of the agreement between buyer, seller, and/or other transaction entities being directly written into lines of code. The code and the agreements contained therein exist across a distributed and in some cases fully or partially decentralized blockchain network. The code controls the execution, and transactions are trackable and irreversible. In some cases, later additional smart contracts can modify existing smart contracts, and in other cases this is not possible. Smart contracts can enable trusted transactions and agreements to be carried out among disparate, anonymous parties or external enforcement mechanism.

DAML alignment can also be achieved, since the DAML ledger API primary mechanism can be gRPC. Concord thin replica mechanism alignment can also be achieved, since thin replica is a pub-sub model which uses gRPC. The signer application 106 (e.g., EthSigner) can allow users to secure their identity separately from the end-user dApp 103 and the blockchain ledger client 109. This adds an additional layer of security to operating in blockchains 151 including Ethereum® blockchains. The signer application 106 can sign transactions using a key secured in a key vault 112 or other datastore maintained by any one of a variety of cloud providers, or encrypted on a local disk local to the end-user dApp 103 or the signer application 106. Using a signer application 106 can operate to secure identity and all associated digital assets using a secure server-based solution separate from an end-user device that may be more easily compromised.

A user identity in the blockchain 151, or a user account, can be defined using a blockchain private key, such as Ethereum® blockchain private key. This can include 32 bytes or another amount of random data. The blockchain private key can be a user identifier, and can be used for access control including permissions control for assets that are recorded using blockchain transactions with a blockchain 151. This can include transactions of fungible and non-fungible tokens that represent the assets in the blockchain 151. This can also include currencies, smart contracts, among other assets defined in a blockchain 151 managed by one or more blockchain ledger clients 109.

Access control can be provided by using cryptographic signatures. A signature can include a unique and unforgeable identifier, which can prove that a given piece of data was produced using the blockchain private key. Each blockchain transaction submitted using components of the networked environment 100 can include a signature, which can be generated using the blockchain private key. The signature proves a user's intent to execute a transaction against a blockchain 151. In other words, the blockchain private key can be used to sign a blockchain transaction.

A blockchain private key or user identifier can enable the following actions relative to a blockchain 151:
  a. Transfer a user's fungible and non-fungible tokens (e.g., Ether) to another account,
  b. Invoke contracts on the user's behalf:
  c. Lock up the user's tokens by self-destructing that user's multisignature wallet
  d. Liquidate that user's Maker CDPs
  e. Cast votes
  f. Control that user's CryptoKitty breeding program
  g. Sign Transactions on the blockchain 151, such as an Ethereum® Network blockchain 151

As a result, if the blockchain private key is exposed to another entity, that entity can exercise control over that user's blockchain assets, and can write new blockchain transactions to the blockchain 151 record.

Ethereum® blockchain and other blockchain transactions can be signed by any one of a number of signing entities among various embodiments. For example, external wallet applications, such as the signer application 106 can control blockchain private key and sign transactions. By using the signer application 106, users can separate key storage/management from business logic. This separation can ensure that blockchain private keys are maintained securely.

In other implementations, the blockchain ledger client 109 can incorporate an integrated wallet component, which can be used to control, protect, and act as a container for blockchain private keys. The blockchain private keys can either be stored in a file-system accessible to the blockchain ledger client 109 or in a hardware security module (HSM).

Alternatively, the end-user dApp 103 can directly sign transactions and communicate with the blockchain ledger client 109. The end-user dApp 103 can itself utilize a third party wallet application or key vault 112 executed locally and/or remotely from the end-user dApp 103. The third party wallet application or key vault 112 can control access to blockchain private keys and sign transactions in communication with the end-user dApp 103. Some wallet applications can act as a passthrough service, sitting on the network link between the end-user dApp 103 and an interface of the blockchain ledger client 109.

In implementations that use a signer application 106, the signer application 106 can be responsible for forwarding blockchain transaction requests to the blockchain ledger client 109. The content of a blockchain transaction requests itself can be unchanged by the signer application 106, but the signer application 106 can generate and append a signature using a blockchain private key. The blockchain private key can be associated with a particular end-user dApp 103 or a particular user identifier of a user that initiated the request. It can then forward the signed transaction request to the blockchain ledger client 109 for inclusion to the blockchain 151. In various embodiments, the blockchain private key can be stored and retrieved (e.g., by the signing entity) from a key vault 112 such as a V3 keystore file, a Hashicorp Vault, an Azure KeyVault, or another keystore or vault that can be local or remote from the signing entity, and can be managed by the same entity or a third party.

Figure 2:
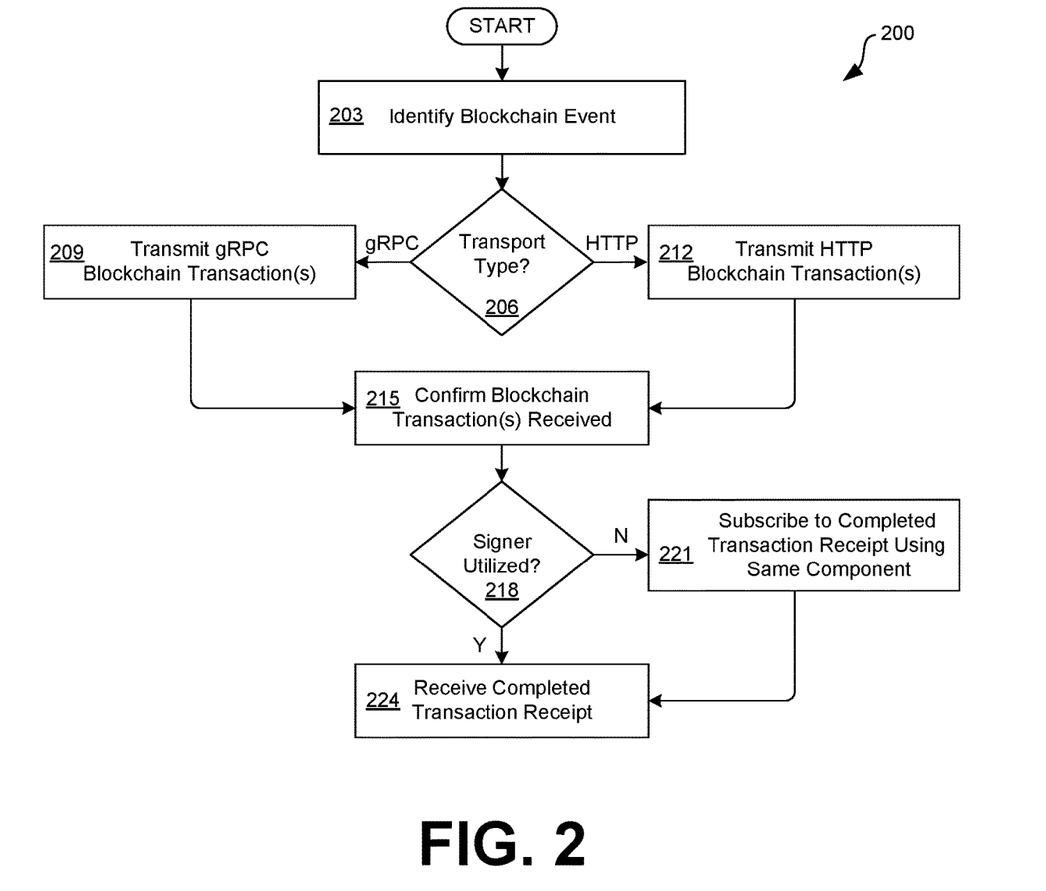
FIG. 2 is a flowchart depicting functionalities performed by components of the blockchain API communication mechanism of FIG. 1, according to embodiments of the present disclosure.

FIG. 2 depicts a flowchart 200 performed by components of the networked environment 100 of FIG. 1. Generally, the flowchart 200 can describe how the end-user dApp 103 works in concert with other components of the networked environment 100 to provide an efficient blockchain API communication mechanism. The steps of the flowchart 200 can be described as performed by the end-user dApp 103. However, aspects of the flowchart 200 can be performed by other components of the networked environment 100.

In step 203, the end-user dApp 103 can identify a blockchain event. The end-user dApp 103 can identify a user request to transfer currencies and other assets, sign or approve a contract or smart contract, and other user requests. The end-user dApp 103 can also identify sensor-based, user-indicated, or another blockchain event that affects a set of predetermined dependencies of a smart contract of a blockchain 151. The end-user dApp 103 can receive a user input or receive a sensor parameter. The end-user dApp 103 can analyze a smart contract or otherwise map the blockchain event to a particular blockchain 151. User credentials, a blockchain 151 identifier, or an identifier of the sensor parameter can be utilized to map the blockchain event to a particular blockchain 151.

In step 206, the end-user dApp 103 can identify or determine a transport type. For example, the transport type can be a particular version of gRPC, HTTP, or another transport. The end-user dApp 103 can include or access a configuration file or other code that specifies at least one of the transport type and an endpoint for blockchain transactions. The transport type can be mapped to the particular endpoint of a transport component. For example, an end-user dApp 103 can include a modified dApp that specifies a protocol-specific transfer component endpoint such as a gRPC endpoint or an HTTP endpoint. The protocol-specific endpoint can identify a signer HTTP component 131, a signer WebSocket component 134, or a signer gRPC component 137 of a signer application 106; or a ledger HTTP component 141, a ledger WebSocket component 144, or a ledger gRPC component 147 of a blockchain ledger client 109. In some cases, the end-user dApp 103 can include a symbol or set of characters that comments-out or prevents processing code that specifies a previously used endpoint and adds code that specifies the protocol-specific endpoint.

If the endpoint specified in the configuration file is associated with an HTTP component such as the signer HTTP component 131 or ledger HTTP component 141, then the process can move to step 212. If the endpoint specified in the configuration file is associated with a gRPC component such as the signer gRPC component 137 or ledger gRPC component 147, then the process can move to step 209. If the endpoint is associated with a signer application 106, such as the signer HTTP component 131 or the signer gRPC component 137, then the blockchain transaction can be an unsigned transaction. Otherwise, if the endpoint is associated with a blockchain ledger client 109, such as the ledger HTTP component 141 or the ledger gRPC component 147, then the blockchain transaction can be a key-signed blockchain transaction signed using a blockchain private key of a user that is authorized to write to the blockchain 151.

In step 209, the end-user dApp 103 can transmit a gRPC blockchain transaction. The end-user gRPC component 127 can format and transmit the gRPC blockchain transaction to a specified gRPC endpoint using a gRPC protocol. In some examples, the end-user gRPC component 127 can invoke a synchronous (or asynchronous) gRPC blockchain transaction API that uses the gRPC protocol. The gRPC blockchain transaction API can be provided by the signer gRPC component 137 or the ledger gRPC component 147.

If the endpoint is associated with a signer application 106, such as the signer gRPC component 137, then the blockchain transaction can be a key-signed transaction. Otherwise, if the endpoint is associated with a blockchain ledger client 109, such as the ledger gRPC component 147, then the blockchain transaction can be a key-signed blockchain transaction.

In step 212, the end-user dApp 103 can transmit an HTTP blockchain transaction. The end-user HTTP component 121 can format and transmit the HTTP blockchain transaction to a specified HTTP endpoint using a HTTP protocol. In some examples, the end-user HTTP component 121 can invoke a synchronous (or asynchronous) HTTP blockchain transaction API that uses HTTP. The HTTP blockchain transaction API can be provided by the signer HTTP component 131 or the ledger HTTP component 141.

If the endpoint is associated with a signer application 106, such as the signer HTTP component 131, then the blockchain transaction can be a key-signed transaction. Otherwise, if the endpoint is associated with a blockchain ledger client 109, such as the ledger HTTP component 141, then the blockchain transaction can be a key-signed blockchain transaction.

In step 215, the end-user dApp 103 can confirm that the blockchain transaction is received. The end-user HTTP component 121 of the end-user dApp 103 can transmit an HTTP blockchain transaction as a synchronous HTTP request, and a confirmation that the HTTP blockchain transaction is received can be returned as a synchronous HTTP response. The end-user gRPC component 127 of the end-user dApp 103 can transmit a gRPC blockchain transaction as a synchronous gRPC request, and a confirmation that the gRPC blockchain transaction is received can be returned as a synchronous gRPC response.

In step 218, the end-user dApp 103 can determine whether a signer application 106 is used. If a signer application 106 is not used, or if the end-user dApp 103 communicates directly with the blockchain ledger client 109, then the end-user dApp 103 can move to step 221. If a signer application 106 is used, then the signer application 106 can perform a subscription process, and the end-user dApp 103 can move to step 224.

As with other steps in the flowchart 200, the determination of whether the signer application 106 is utilized can be performed at another point in the process. The use of a signer application 106 can also affect other aspects of the flowchart 200, such as a recipient of the blockchain transaction transmitted in steps 209 and 212 and the form of the blockchain transaction. While an unsigned blockchain transaction can be transmitted from the end-user dApp 103 to a signer application 106, a keysigned blockchain transaction can be transmitted from the end-user dApp 103 to the blockchain ledger client 109.

If a signer application 106 is used, the signer application 106 can subscribe to completed transaction receipts using the transport type that is identified in step 206. The signer application 106 can subscribe its own transport component, such as the signer gRPC component 137 or the signer HTTP component 131 in association with a subscription identifier. The signer application 106 can also subscribe a transport component of the end-user dApp 103, such as end-user gRPC component 127 or the end-user HTTP component 121. The signer application 106 can transmit a subscription request to the blockchain ledger client 109. The subscription request can specify a transport component endpoint as well as a subscription identifier for one or more blockchain transactions.

In step 221, the end-user dApp 103 can subscribe to completed transaction receipts using the same transport component that is identified in step 206. If the end-user HTTP component 121 is utilized to transmit the blockchain transaction, then the same protocol or the same end-user HTTP component 121 can be used to subscribe to asynchronous completed transaction receipts. The end-user gRPC component 127 can be utilized to transmit a synchronous blockchain transaction request, and the same protocol or the same end-user gRPC component 127 can be used to subscribe to and receive asynchronous completed transaction receipts. This can simplify the process since future protocol updates can be implemented by updating a single protocol or component of the end-user dApp 103. The use of the subscription model and asynchronous messaging for completed transaction receipts can also reduce data usage and energy usage.

The end-user dApp 103 can transmit a subscription request to the blockchain ledger client 109. The subscription request can specify a transport component endpoint as well as a subscription identifier. The subscription identifier can be associated with all transactions of a blockchain 151, a subscription identifier associated with a particular block chain transaction, a subscription identifier associated with a set of block chain transactions, or a subscription identifier associated with a smart contract that is tracked using one or more blockchain 151. Multiple blockchain transactions can be indicated as successful or failed within a single transaction receipt published to subscribers to a particular subscription identifier.

In step 224, the end-user dApp 103 can receive a completed transaction receipt. The end-user dApp 103 can receive a completed transaction receipt published by the blockchain ledger client 109 in association with a subscription identifier. The end-user dApp 103 can receive the completed transaction receipt published by the blockchain ledger client 109 whether the end-user dApp 103 or the signer application 106 transmits the subscription request. The end-user dApp 103 can receive a completed transaction receipt from a signer application 106. The signer application 106 can receive the completed transaction receipt and can relay the completed transaction receipt to the end-user dApp 103.

Figure 3:
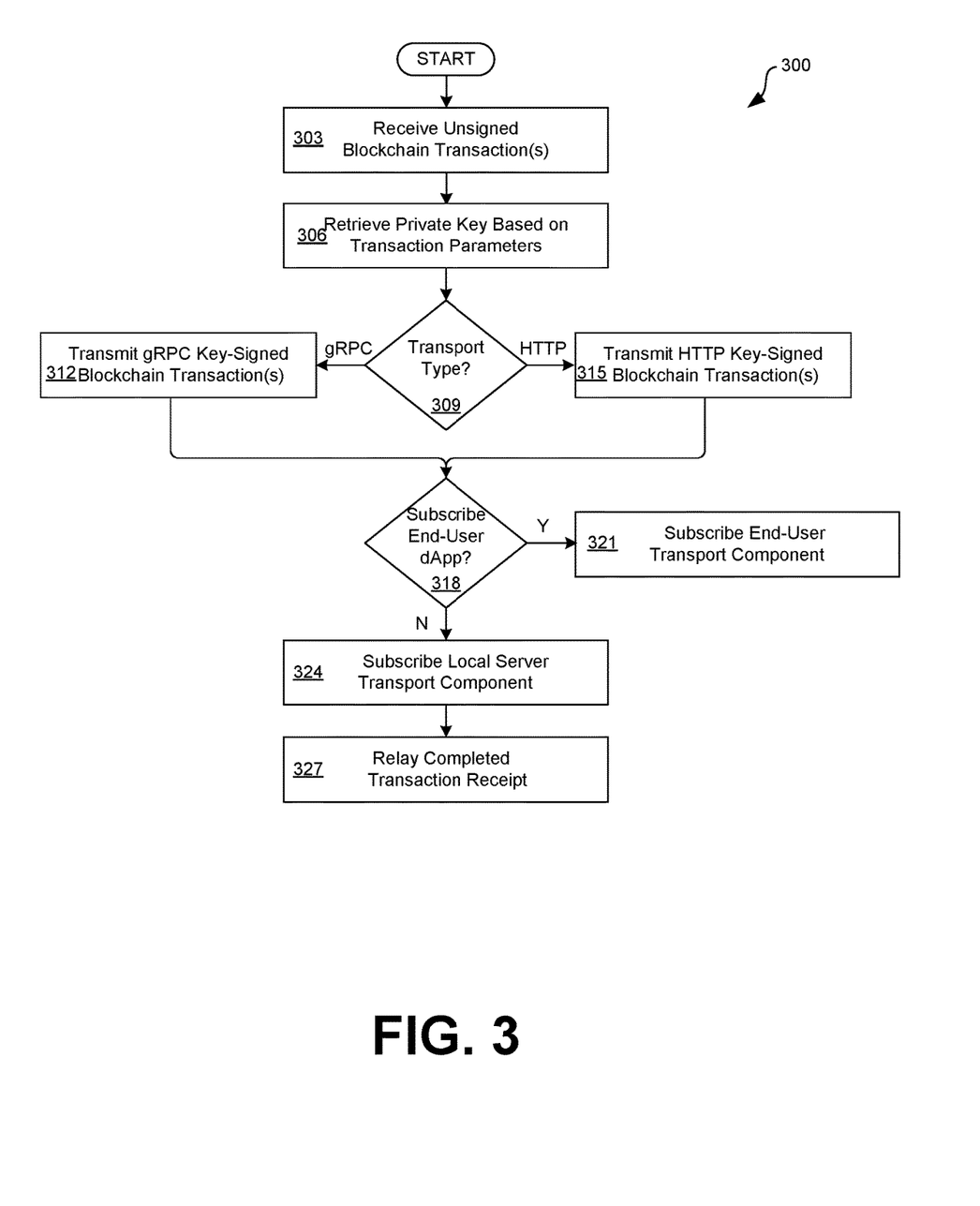
FIG. 3 is a flowchart depicting functionalities performed by components of the blockchain API communication mechanism of FIG. 1, according to embodiments of the present disclosure.

FIG. 3 depicts a flowchart 300 performed by components of the networked environment 100 of FIG. 1. Generally, the flowchart 300 can describe how a signer application 106, such as a signer dApp or a third party application, works in concert with other components of the networked environment 100 to provide an efficient blockchain API communication mechanism. The steps of the flowchart 300 can be described as performed by the signer application 106. However, aspects of the flowchart 300 can be performed by other components of the networked environment 100.

In step 303, the signer application 106 can receive an unsigned blockchain transaction. The signer application 106 can receive the unsigned blockchain transaction from an end-user dApp 103. The signer application 106 can receive the unsigned blockchain transaction as a synchronous (or asynchronous) HTTP request received through an endpoint of the signer HTTP component 131. The signer application 106 can alternatively receive the unsigned blockchain transaction as a synchronous (or asynchronous) gRPC request using an endpoint of the signer gRPC component 137. The signer application 106 can return a confirmation that the unsigned blockchain transaction is received. The signer application 106 can return a synchronous HTTP response using the signer HTTP component 131 or a synchronous gRPC response using the signer gRPC component 137.

In step 306, the signer application 106 can retrieve a blockchain private key based on transaction parameters of the unsigned blockchain transaction. The parameters can include an endpoint, address, UDID, or another identifier associated with a particular end-user dApp 103. The parameters can include user credentials or another type of user identifier. The blockchain private key can be stored and retrieved from a key vault 112 such as a V3 keystore file, a Hashicorp Vault, an Azure KeyVault, or another keystore or vault that can be local or remote from the signing entity, and can be managed by the same entity or a third party. The signer application 106 can use one or more of the transaction parameters to retrieve the blockchain private key from the key vault 112. The signer application 106 can then use the blockchain private key to sign the blockchain transaction.

In step 309, the signer application 106 can identify or determine a transport type. The signer application 106 can include or access a configuration file or other code that specifies at least one of the transport type and a blockchain ledger client 109 endpoint for blockchain transactions. In some cases, the transport type can be mapped to an endpoint of a transport component of the blockchain ledger client 109. For example, the signer application 106 can include code that specifies a protocol-specific transfer component endpoint of the blockchain ledger client 109. The endpoint can include a ledger HTTP component 141 or a ledger gRPC component 147 of the blockchain ledger client 109. In some cases, the signer application 106 can include a symbol or set of characters that comments-out or prevents processing code that specifies a previously used endpoint and adds code that specifies the protocol-specific endpoint of the blockchain ledger client 109. If the endpoint specified in the configuration file is associated with the ledger gRPC component 147, then the process can move to step 312. If the endpoint specified in the configuration file is associated with the ledger HTTP component 141, then the process can move to step 315.

Alternatively, the signer application 106 can identify or determine a transport type to use based on a protocol used by the unsigned blockchain transaction, or an endpoint used to send or receive the unsigned blockchain transaction. For example, if the signer gRPC component 137 receives an unsigned blockchain transaction in a gRPC protocol format, then the process can move to step 312. If the signer HTTP component 131 receives an unsigned blockchain transaction in an HTTP format, then the process can move to step 315.

In step 312, the signer application 106 can transmit a gRPC key-signed blockchain transaction. The signer gRPC component 137 can format and transmit the gRPC key-signed blockchain transaction to a specified gRPC endpoint using a gRPC protocol. The signer gRPC component 137 can invoke a synchronous gRPC blockchain transaction API of the ledger gRPC component 147. In other words, the signer application 106 can transmit the unsigned blockchain transaction as a synchronous gRPC based blockchain transaction request from the signer gRPC component 137 to the ledger gRPC component 147. The ledger gRPC component 147 can return a confirmation that the blockchain transaction is received as a synchronous gRPC response.

In step 315, the signer application 106 can transmit an HTTP key-signed blockchain transaction. The signer HTTP component 131 can format and transmit the HTTP key-signed blockchain transaction to a specified HTTP endpoint using a HTTP protocol. The signer HTTP component 131 can invoke a synchronous HTTP blockchain transaction API of the ledger HTTP component 141. In other words, the signer application 106 can transmit the unsigned blockchain transaction as a synchronous HTTP based blockchain transaction request from the signer HTTP component 131 to the ledger HTTP component 141. The ledger HTTP component 141 can return a confirmation that the blockchain transaction is received as a synchronous HTTP response.

In step 318, the signer application 106 can determine whether to subscribe a component of an end-user dApp 103 or a component of the signer application 106 to receive completed transaction receipts published by the blockchain ledger client 109. If a configuration, setting, or transaction parameter of the unsigned blockchain transaction indicates that a component of the end-user dApp 103 should be subscribed to receive completed transaction receipts, then the process can move to step 321. Otherwise, if a configuration, setting, or transaction parameter of the unsigned blockchain transaction indicates that a component of the signer application 106 should be subscribed to receive completed transaction receipts, then the process can move to step 324.

In step 321, the signer application 106 can subscribe an end-user transport component such as the end-user gRPC component 127, or the end-user HTTP component 121, to receive completed transaction receipts. The signer application 106 can transmit a subscription request to the blockchain ledger client 109. The subscription request can specify a transport component endpoint of the end-user gRPC component 127 or the end-user HTTP component 121, as well as a subscription identifier. The subscription identifier can be associated with all transactions of a blockchain 151, a subscription identifier associated with a particular block chain transaction, a subscription identifier associated with a set of block chain transaction, or a subscription identifier associated with a smart contract that is tracked using one or more blockchain 151. Multiple blockchain transactions can be indicated as successful or failed within a single transaction receipt published to subscribers to a particular subscription identifier. Once published, the transport component endpoint of the end-user gRPC component 127 or the end-user HTTP component 121 can receive the completed transaction receipts corresponding to the subscription identifier.

In step 324, the signer application 106 can subscribe a local server transport component such as the signer gRPC component 137, or the signer HTTP component 131, to receive completed transaction receipts. The signer application 106 can transmit a subscription request to the blockchain ledger client 109. The subscription request can specify a transport component endpoint of the signer gRPC component 137 or the signer HTTP component 131, as well as a subscription identifier.

In step 327, the signer application 106 can relay completed transaction receipts to an end-user dApp 103. Once published, the signer gRPC component 137 or the signer HTTP component 131 can receive the completed transaction receipts corresponding to the subscription identifier. The signer application 106 can identify an appropriate endpoint of the end-user dApp 103, such as the end-user gRPC component 127 or the end-user HTTP component 121 that provided the unsigned blockchain transaction in step 303. The signer application 106 can then transmit the completed transaction receipts to the end-user gRPC component 127 or the end-user HTTP component 121.

Figure 4:
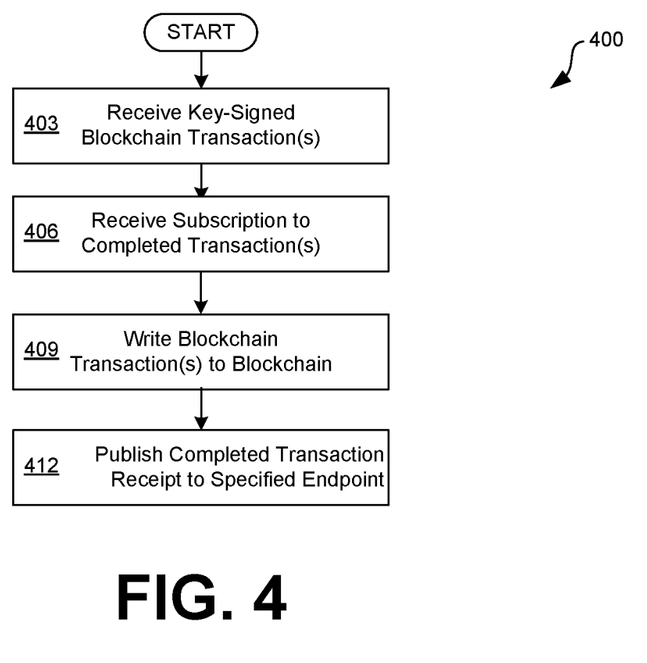
FIG. 4 is a flowchart depicting functionalities performed by components of the blockchain API communication mechanisms of FIG. 1, according to embodiments of the present disclosure.

FIG. 4 depicts a flowchart 400 performed by components of the networked environment 100 of FIG. 1. Generally, the flowchart 400 can describe how a blockchain ledger client 109 works in concert with other components of the networked environment 100 to provide an efficient blockchain API communication mechanism. The steps of the flowchart 400 can be described as performed by the blockchain ledger client 109. However, aspects of the flowchart 400 can be performed by other components of the networked environment 100.

In step 403, the blockchain ledger client 109 can receive one or more key-signed blockchain transactions. The ledger HTTP component 141 of the blockchain ledger client 109 can provide a synchronous HTTP API that can receive key-signed blockchain transactions in an HTTP format. The ledger gRPC component 147 of the blockchain ledger client 109 can provide a synchronous gRPC API that can receive key-signed blockchain transactions in an gRPC format. The blockchain ledger client 109 can provide a synchronous response indicating that the blockchain transaction is received.

In step 406, the blockchain ledger client 109 can also receive a subscription request for completed transaction receipts. The subscription request can specify an endpoint to receive published completed transaction receipts, and a subscription identifier. The ledger HTTP component 141 of the blockchain ledger client 109 can provide an asynchronous HTTP API that can receive subscription requests in an HTTP format. The ledger gRPC component 147 of the blockchain ledger client 109 can provide an asynchronous gRPC API that can receive subscription requests in a gRPC format.

In step 409, the blockchain ledger client 109 can write the one or more blockchain transactions to the blockchain 151. For each transaction, the blockchain ledger client 109 can determine whether the private key is valid and has the authority to write the particular transaction to the blockchain 151. If the private key is valid and has the authority to write the transaction, then the blockchain ledger client 109 can write the transaction to the blockchain 151. In some examples, the blockchain ledger client 109 can communicate with multiple blockchain ledger clients 109 to determine whether the private key is valid and has the authority to write the particular transaction to the blockchain 151. Alternatively, the private key can be valid and can lack authority to write the particular transaction to the blockchain 151. In this example, the transaction will fail or be denied.

In step 412, the blockchain ledger client 109 can publish a completed transaction receipt to an endpoint specified in the subscription request. The completed transaction receipt can indicate whether a blockchain transaction is accepted and successfully applied to the blockchain 151, or if it is rejected. In some examples, a completed transaction receipt can indicate a reason for the rejection. For example, a completed transaction receipt can indicate that a private key is invalid or has insufficient authority to perform the transaction on the blockchain 151. A single completed transaction receipt can include results for multiple blockchain transactions corresponding to the specified subscription identifier.

Figure 5:
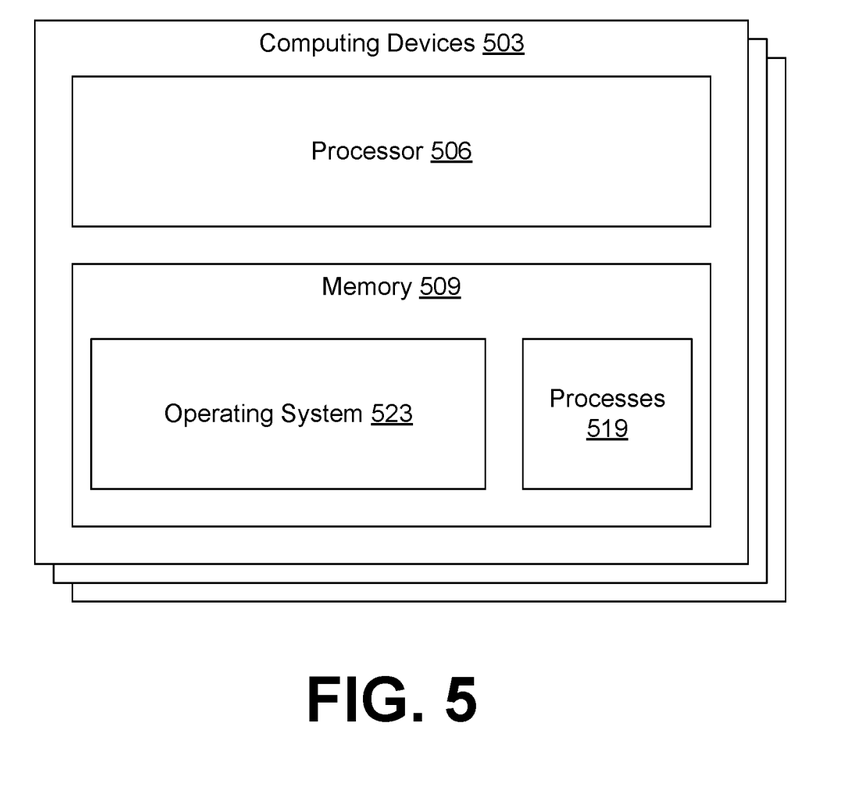
FIG. 5 is a drawing depicting a computing device for one or more of the components of the networked environment.

FIG. 5 depicts a schematic block diagram of one example of one or more computing devices 503 for the components of the networked environment of FIG. 1, according to various embodiments of the present disclosure. A computing device 503 can have one or more processors 506. The computing device 503 can also have a memory 509.

The processor 506 can represent any circuit or combination of circuits that can execute one or more machine-readable instructions stored in the memory 509 that make up a computer program or process and store the results of the execution of the machine-readable instructions in the memory 509. In some implementations, the processor 506 may be configured to perform one or more machine-readable instructions in parallel or out of order. This could be done if the processor 506 includes multiple processor cores and/or additional circuitry that supports simultaneous multithreading (SMT). Examples of a processor 506 can include a central processing unit (CPU), a graphics processing unit (GPU), a field-programmable gate array (FPGA), application specific integrated circuits (ASICs), etc.

The memory 509 can include both volatile and nonvolatile memory and data storage components. Volatile components are those that do not retain data values upon loss of power. Nonvolatile components are those that retain data upon a loss of power. Thus, the memory 509 can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device. Various types of data and machine-readable instructions may be stored in the memory 509. For example, one or more processes 519 may be stored in the memory 509. In some implementations, an operating system 523 may also be stored in the memory 509.

A process 519 can represent a collection of machine-readable instructions stored in the memory 509 that, when executed by the processor 506 of the computing device 503, cause the computing device 503 to perform one or more tasks. A process 519 can represent a program, a sub-routine or sub-component of a program, a library used by one or more programs, etc. When a process requests access to a hardware or software resource for which it lacks permission to interact with, the process 519 can generate an interrupt and provide or send the interrupt to the operating system 523.

The operating system 523 can include any system software that manages the operation of computer hardware and software resources of the computing device 503. The operating system 523 can also provide various services or functions to computer programs, such as processes 519, that are executed by the computing device 503. Accordingly, the operating system 523 may schedule the operation of tasks or processes 519 by the processor 506, act as an intermediary between processes 519 and hardware of the computing device 503. The operating system 523 may also implement and/or enforce various security safeguards and mechanisms to prevent access to hardware or software resources by unprivileged or unauthorized users or processes 519.

The operating system 523 can also implement a virtual memory system that provides an abstract representation of the memory 509 available on the computing device 503, such as the RAM. Among the features provided by the virtual memory system are a per process 519 address space, which maps virtual addresses used by a process 519 to physical addresses of the memory 509. The processor's memory management unit (MMU) can translate these virtual addresses to physical addresses, when used. The operating system 523 can use the virtual memory system to present more memory 509 to individual processes 519 than is physically available.

A number of software components discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), persistent memory, hard drive, solid-state drive, Universal Serial Bus (USB) flash drive, memory card, optical disc such as compact disc (CD) or digital versatile disc (DVD), floppy disk, magnetic tape, or other memory components.

Memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, graphics processing units (GPUs), field-programmable gate arrays (FPGAs), or other components, etc. Such technologies are generally well known by those skilled in the art and, consequently, are not described in detail herein.

Flowcharts can be used to describe the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although flowcharts can show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X, Y, or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. While concepts of the present disclosure are discussed with respect to a particular figure, the concepts can also be used in connection with the other figures. All such modifications and variations are intended to be included herein within the scope of this disclosure and protected by the following claims.

Therefore, the following is claimed:

1. A system, comprising:

at least one computing device comprising at least one processor; and at least one memory comprising machine-readable instructions executable by the at least one processor to cause the at least one computing device perform operations comprising:

identifying, by a blockchain decentralized application, a blockchain event;

mapping, by the blockchain decentralized application, the blockchain event to a blockchain;

identifying, by the blockchain decentralized application, an endpoint of a remote transport component for blockchain transactions on the blockchain;

identifying, from a mapping stored by the blockchain decentralized application, a specified communication protocol used by the endpoint of the remote transport component;

transmitting, from the blockchain decentralized application to the remote transport component, a synchronous blockchain transaction request that uses the specified communication protocol;

receiving, by the blockchain decentralized application, a synchronous response that confirms the synchronous blockchain transaction request is successfully received;

transmitting, by the blockchain decentralized application to the remote transport component, an asynchronous subscription request that uses the specified communication protocol; and receiving, by the blockchain decentralized application, a published asynchronous notification comprising a completed transaction receipt for a blockchain transaction associated with the synchronous blockchain transaction request.

2. The system of claim 1, wherein the specified communication protocol comprises an open source remote procedure call protocol.

3. The system of claim 2, wherein the synchronous blockchain transaction request and the asynchronous subscription request are respectively transmitted using the open source remote procedure call protocol and a language-neutral, platform-neutral, extensible data structure.

4. The system of claim 1, wherein the specified communication protocol comprises a particular version of hypertext transfer protocol (HTTP).

5. The system of claim 1, wherein the blockchain decentralized application is an end-user decentralized application or a signer application.

6. The system of claim 1, wherein the published asynchronous notification comprises a plurality of completed transaction receipts for a plurality of blockchain transactions.

7. The system of claim 1, wherein the blockchain decentralized application comprises a signer application, and wherein the operations further comprise:

retrieving, by the signer application, a private key from a key vault, the private key being retrieved using at least one transaction parameter of an unsigned blockchain transaction received from an end-user decentralized application; and signing by the signer application, the blockchain transaction using the private key.

8. A non-transitory computer readable medium comprising machine-readable instructions executable by at least one processor to cause at least one computing device to at least: perform operations comprising:

identifying, by a blockchain decentralized application, a blockchain event;

mapping, by the blockchain decentralized application, the blockchain event to a blockchain;

identifying, by the blockchain decentralized application, an endpoint of a remote transport component for blockchain transactions on the blockchain;

identifying, from a mapping stored by the blockchain decentralized application, a specified communication protocol used by the endpoint of the remote transport component;

transmitting, from the blockchain decentralized application to the remote transport component, a synchronous blockchain transaction request that uses the specified communication protocol;

receiving, by the blockchain decentralized application, a synchronous response that confirms the synchronous blockchain transaction request is successfully received;

transmitting, by the blockchain decentralized application to the remote transport component, an asynchronous subscription request that uses the specified communication protocol; and receiving, by the blockchain decentralized application, a published asynchronous notification comprising a completed transaction receipt for a blockchain transaction associated with the synchronous blockchain transaction request.

9. The non-transitory computer readable medium of claim 8, wherein the specified communication protocol comprises an open source remote procedure call protocol.

10. The non-transitory computer readable medium of claim 9, wherein the synchronous blockchain transaction request and the asynchronous subscription request are respectively transmitted using the open source remote procedure call protocol and a language-neutral, platform-neutral, extensible data structure.

11. The non-transitory computer readable medium of claim 8, wherein the specified communication protocol comprises a particular version of hypertext transfer protocol (HTTP).

12. The non-transitory computer readable medium of claim 8, wherein the blockchain decentralized application is an end-user decentralized application or a signer application.

13. The non-transitory computer readable medium of claim 8, wherein the published asynchronous notification comprises a plurality of completed transaction receipts for a plurality of blockchain transactions.

14. The non-transitory computer readable medium of claim 8, wherein the blockchain decentralized application comprises a signer application, and wherein the operations further comprise:

retrieve, by the signer application, a private key from a key vault, the private key being retrieved using at least one transaction parameter of an unsigned blockchain transaction received from an end-user decentralized application; and sign, by the signer application, the blockchain transaction using the private key.

15. A method comprising:

identifying, by a blockchain decentralized application, a blockchain event;

mapping, by the blockchain decentralized application, the blockchain event to a blockchain;

identifying, by the blockchain decentralized application, an endpoint of a remote transport component for blockchain transactions on the blockchain;

identifying, from a mapping stored by the blockchain decentralized application, a specified communication protocol used by the endpoint of the remote transport component;

transmitting, from the blockchain decentralized application to the remote transport component, a synchronous blockchain transaction request that uses the specified communication protocol;

receiving, by the blockchain decentralized application, a synchronous response that confirms the synchronous blockchain transaction request is successfully received;

transmitting, by the blockchain decentralized application to the remote transport component, an asynchronous subscription request that uses the specified communication protocol; and receiving, by the blockchain decentralized application, a published asynchronous notification comprising a completed transaction receipt for a blockchain transaction associated with the synchronous blockchain transaction request.

16. The method of claim 15, wherein the specified communication protocol comprises an open source remote procedure call protocol.

17. The method of claim 16, wherein the synchronous blockchain transaction request and the asynchronous subscription request are respectively transmitted using the open source remote procedure call protocol and a language-neutral, platform-neutral, extensible data structure.

18. The method of claim 15, wherein the specified communication protocol comprises a particular version of hypertext transfer protocol (HTTP).

19. The method of claim 15, wherein the blockchain decentralized application is an end-user decentralized application or a signer application.

20. The method of claim 15, wherein the published asynchronous notification comprises a plurality of completed transaction receipts for a plurality of blockchain transactions.

* * * * *